United States Patent
Yu et al.

(10) Patent No.: US 10,363,944 B1
(45) Date of Patent: Jul. 30, 2019

(54) METHOD AND APPARATUS FOR EVALUATING PEDESTRIAN COLLISION RISKS AND DETERMINING DRIVER WARNING LEVELS

(71) Applicant: GM Global Technology Operations LLC, Detroit, MI (US)

(72) Inventors: Bo Yu, Warren, MI (US); Robert A. Bordo, Harrison Township, MI (US); Vivek Vijaya Kumar, Shelby Township, MI (US); Hariharan Krishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/896,669

(22) Filed: Feb. 14, 2018

(51) Int. Cl.
| | |
|---|---|
| *B60W 50/14* | (2012.01) |
| *G08G 1/01* | (2006.01) |
| *G08G 1/0962* | (2006.01) |
| *B60W 50/00* | (2006.01) |
| *B60W 30/095* | (2012.01) |

(52) U.S. Cl.
CPC ........ *B60W 50/14* (2013.01); *B60W 30/0956* (2013.01); *B60W 50/0097* (2013.01); *G08G 1/0116* (2013.01); *G08G 1/0962* (2013.01); *B60W 2050/143* (2013.01)

(58) Field of Classification Search
CPC ............. B60W 50/0097; B60W 50/14; B60W 30/0956; B60W 2050/143; G08G 1/0116; G08G 1/0962; G08G 1/164; G08G 1/166; G08G 1/167; G05D 2201/0213; G05D 1/0088
See application file for complete search history.

(56) References Cited

U.S. PATENT DOCUMENTS

| | | | | |
|---|---|---|---|---|
| 8,849,494 B1* | 9/2014 | Herbach | ............... | B60W 30/00 701/24 |
| 8,996,224 B1* | 3/2015 | Herbach | .............. | G05D 1/0011 180/116 |
| 9,008,890 B1* | 4/2015 | Herbach | ............... | B60W 30/00 701/26 |
| 9,381,916 B1* | 7/2016 | Zhu | .................. | B60W 30/0956 |
| 9,541,410 B1* | 1/2017 | Herbach | ............... | B60W 30/00 |
| 9,766,626 B1* | 9/2017 | Zhu | .................. | B60W 30/0956 |
| 9,786,178 B1* | 10/2017 | Bai | ......................... | G08G 1/166 |
| 9,805,474 B1* | 10/2017 | Whiting | ................. | G08G 1/166 |

(Continued)

*Primary Examiner* — Orlando Bousono
(74) *Attorney, Agent, or Firm* — Cantor Colburn LLP (57) ABSTRACT

Technical solutions are described for generating a pedestrian detection warning in a vehicle. An example method includes constructing, by a vehicle controller, a pedestrian zone based on pedestrian information that is received from a traffic controller. The method further includes computing, by the vehicle controller, a vehicle trajectory that predicts a path for the vehicle. The method further includes determining, by the vehicle controller, a minimal distance between the pedestrian zone and the vehicle trajectory. The method further includes predicting, by the vehicle controller, a time to collision by computing a time for the vehicle to reach a location corresponding to the minimal distance along the vehicle trajectory. The method further includes in response to the time to collision being below a threshold, generating, by the vehicle controller, a warning for an operator of the vehicle.

17 Claims, 5 Drawing Sheets

(56) References Cited

U.S. PATENT DOCUMENTS

| | | | |
|---|---|---|---|
| 9,884,585 B1* | 2/2018 | Lubbers | B60Q 1/525 |
| 9,908,470 B1* | 3/2018 | Englander | G01S 19/13 |
| 9,933,784 B1* | 4/2018 | Herbach | B60W 30/00 |
| 2005/0073438 A1* | 4/2005 | Rodgers | G08G 1/161 |
| | | | 340/944 |
| 2012/0025964 A1* | 2/2012 | Beggs | B60Q 1/2673 |
| | | | 340/435 |
| 2012/0223843 A1* | 9/2012 | Wall | G08G 1/095 |
| | | | 340/944 |
| 2015/0032288 A1* | 1/2015 | Huth | G08G 1/165 |
| | | | 701/1 |
| 2015/0035685 A1* | 2/2015 | Strickland | B60Q 9/008 |
| | | | 340/901 |
| 2017/0169703 A1* | 6/2017 | Carrasco | B60Q 1/525 |
| 2017/0291602 A1* | 10/2017 | Newman | B60W 50/16 |
| 2017/0323448 A1* | 11/2017 | Whiting | G08G 1/166 |
| 2017/0372612 A1* | 12/2017 | Bai | G08G 1/166 |
| 2018/0096605 A1* | 4/2018 | Bai | G08G 1/166 |
| 2018/0118106 A1* | 5/2018 | You | B60Q 5/008 |

* cited by examiner

FIG. 5

METHOD AND APPARATUS FOR EVALUATING PEDESTRIAN COLLISION RISKS AND DETERMINING DRIVER WARNING LEVELS

The subject disclosure generally relates to a vehicle, and particularly to evaluating pedestrian collision risks and determining driver warning levels based on the evaluation.

In various environments, such as at intersections, parking places, etc., pedestrians and vehicles co-exist in a very close environment. Pedestrians are at many times walking or standing less than one foot from a slow moving vehicle. Due to the density of the traffic within a heavy populated city, vehicles often move at very slow speeds (e.g., less than 10 mph). As a result, pedestrians do not distance themselves from the vehicles; rather, pedestrians may walk, stand, or ride bikes just inches from slow moving vehicles.

Pedestrians are typically aware of vehicles in close proximity to them due to the sound of the running engine. However, vehicles are becoming increasingly quiet during engine-on operations, and therefore, the pedestrians are less likely to hear a vehicle in close proximity. The reduction in noise of the engine is due to enhanced noise suppression as well as the increasing use of electric and hybrid electric vehicles. The actuation of the horn by the driver, although effective, is often viewed as a rude behavior and requires manual intervention by the driver of the vehicle. Some drivers are reluctant to use their horn to warn the pedestrians since it IS viewed as rude behavior and since they may underestimate the danger to the pedestrian.

SUMMARY

According to one or more embodiments a method to generate a pedestrian detection warning in a vehicle includes constructing, by a vehicle controller, a pedestrian zone based on pedestrian information that is received from a traffic controller. The method further includes computing, by the vehicle controller, a vehicle trajectory that predicts a path for the vehicle. The method further includes determining, by the vehicle controller, a minimal distance between the pedestrian zone and the vehicle trajectory. The method further includes predicting, by the vehicle controller, a time to collision by computing a time for the vehicle to reach a location corresponding to the minimal distance along the vehicle trajectory. The method further includes in response to the time to collision being below a threshold, generating, by the vehicle controller, a warning for an operator of the vehicle.

In one or more examples, the pedestrian information comprises a trigger time corresponding to a push button associated with a pedestrian light. Further, the pedestrian information further comprises a pedestrian location. In one or more examples, the vehicle trajectory is computed based on vehicle information that comprises at least one of a vehicle speed, a vehicle location, and a vehicle yaw rate.

In one or more examples, the method further includes computing a time-decay risk as:

$$\text{Risk} = \frac{\text{Ref\_Safe\_Distance}}{\text{Minimal\_Distance}} \cdot CV,$$

where Ref_Safe_Distance is a predetermined parameter and CV is a time decayed confidence-value indicative of a pedestrian being present in the pedestrian zone, wherein the vehicle controller predicts the time to collision in response to the time-decay risk being greater than a risk threshold. The confidence-value is computed as CV=CV+c, where c is a predetermined value, if a pedestrian is observed in the pedestrian zone, and as $CV_{t2}=CV_{t1}+f(t2-t1)$ wherein $CV_{t2}$ is the confidence-value at time t2 if there is no updated pedestrian information since time t1, and wherein the function $f$ is a monotonically decreasing function.

In one or more examples, generating the warning further includes selecting a warning level based on a combination of a vehicle status, an environmental visibility, and an intersection familiarity. Determining the vehicle status includes computing $$S = \frac{\text{Vehicle\_Speed}}{\text{Ref\_Safe\_Speed}},$$

where Ref_Safe_Speed is a predetermined parameter, and computing $$C = \frac{TTC}{\text{Ref\_TTC}},$$

where TTC is the time to collision, and Ref_TTC is a predetermined parameter. The environmental visibility is determined based on a brightness value in vicinity of the vehicle, and based on whether a wiper of the vehicle is being used. Further, the intersection familiarity is computed as $$F = \frac{\text{Ref\_Num\_Visits}}{\text{Ref\_Num\_Visits} - \text{Num\_Visits}},$$

where Num_Visits is a number of times the vehicle has passed the intersection in a predetermined duration, and Ref_Num_Visits is a predetermined parameter.

According to one or more embodiments a system for pedestrian warning in a vehicle includes a traffic controller, and a vehicle controller. In one or more examples, the vehicle controller receives pedestrian information from the traffic controller to generate a pedestrian detection warning based on evaluating the pedestrian information. The generation of a pedestrian detection warning in a vehicle includes constructing, by a vehicle controller, a pedestrian zone based on pedestrian information that is received from a traffic controller. The generation further includes computing, by the vehicle controller, a vehicle trajectory that predicts a path for the vehicle. The generation further includes determining, by the vehicle controller, a minimal distance between the pedestrian zone and the vehicle trajectory. The generation further includes predicting, by the vehicle controller, a time to collision by computing a time for the vehicle to reach a location corresponding to the minimal distance along the vehicle trajectory. The generation further includes in response to the time to collision being below a threshold, generating, by the vehicle controller, a warning for an operator of the vehicle.

In one or more examples, the pedestrian information includes a trigger time corresponding to a push button associated with a pedestrian light. The pedestrian information further includes a pedestrian location. In one or more examples, the vehicle trajectory is computed based on vehicle information that comprises at least one of a vehicle speed, a vehicle location, and a vehicle yaw rate.

In one or more examples, the generation of the pedestrian warning further includes computing a time-decay risk as:

$$Risk = \frac{Ref\_Safe\_Distance}{Minimal\_Distance} \cdot CV,$$

where Ref_Safe_Distance is a predetermined parameter and CV is a time decayed confidence-value indicative of a pedestrian being present in the pedestrian zone, wherein the vehicle controller predicts the time to collision in response to the time-decay risk being greater than a risk threshold. The confidence-value is computed as CV=CV+c, where c is a predetermined value, if a pedestrian is observed in the pedestrian zone, and as $CV_{t2}=CV_{t1}+f(t2-t1)$ wherein $CV_{t2}$ is the confidence-value at time t2 if there is no updated pedestrian information since time t1, and wherein the function $f$ is a monotonically decreasing function.

In one or more examples, generating the warning further includes selecting a warning level based on a combination of a vehicle status, an environmental visibility, and an intersection familiarity. Determining the vehicle status includes computing $$S = \frac{Vehicle\_Speed}{Ref\_Safe\_Speed},$$

where Ref_Safe_Speed is a predetermined parameter, and computing $$C = \frac{TTC}{Ref\_TTC},$$

where TTC is the time to collision, and Ref_TTC is a predetermined parameter. The environmental visibility is determined based on a brightness value in vicinity of the vehicle, and based on whether a wiper of the vehicle is being used. Further, the intersection familiarity is computed as $$F = \frac{Ref\_Num\_Visits}{Ref\_Num\_Visits - Num\_Visits},$$

where Num_Visits is a number of times the vehicle has passed the intersection in a predetermined duration, and Ref_Num_Visits is a predetermined parameter.

According to one or more embodiments a computer program product includes one or more computer executable instructions that when executed by a vehicle controller cause the vehicle controller to generate a pedestrian detection warning for a vehicle. The generation of the pedestrian detection warning includes constructing, by a vehicle controller, a pedestrian zone based on pedestrian information that is received from a traffic controller. The generation further includes computing, by the vehicle controller, a vehicle trajectory that predicts a path for the vehicle. The generation further includes determining, by the vehicle controller, a minimal distance between the pedestrian zone and the vehicle trajectory. The generation further includes predicting, by the vehicle controller, a time to collision by computing a time for the vehicle to reach a location corresponding to the minimal distance along the vehicle trajectory. The generation further includes in response to the time to collision being below a threshold, generating, by the vehicle controller, a warning for an operator of the vehicle.

In one or more examples, the pedestrian information includes a trigger time corresponding to a push button associated with a pedestrian light. The pedestrian information further includes a pedestrian location. In one or more examples, the vehicle trajectory is computed based on vehicle information that comprises at least one of a vehicle speed, a vehicle location, and a vehicle yaw rate.

In one or more examples, the generation of the pedestrian warning further includes computing a time-decay risk as:

$$Risk = \frac{Ref\_Safe\_Distance}{Minimal\_Distance} \cdot CV,$$

where Ref_Safe_Distance is a predetermined parameter and CV is a time decayed confidence-value indicative of a pedestrian being present in the pedestrian zone, wherein the vehicle controller predicts the time to collision in response to the time-decay risk being greater than a risk threshold. The confidence-value is computed as CV=CV+c, where c is a predetermined value, if a pedestrian is observed in the pedestrian zone, and as $CV_{t2}=CV_{t1}+f(t2-t1)$ wherein $CV_2$ is the confidence-value at time t2 if there is no updated pedestrian information since time t1, and wherein the function $f$ is a monotonically decreasing function.

In one or more examples, generating the warning further includes selecting a warning level based on a combination of a vehicle status, an environmental visibility, and an intersection familiarity. Determining the vehicle status includes computing $$S = \frac{Vehicle\_Speed}{Ref\_Safe\_Speed},$$

where Ref_Safe_Speed is a predetermined parameter, and computing $$C = \frac{TTC}{Ref\_TTC},$$

where TTC is the time to collision, and Ref_TTC is a predetermined parameter. The environmental visibility is determined based on a brightness value in vicinity of the vehicle, and based on whether a wiper of the vehicle is being used. Further, the intersection familiarity is computed as $$F = \frac{Ref\_Num\_Visits}{Ref\_Num\_Visits - Num\_Visits},$$

where Num_Visits is a number of times the vehicle has passed the intersection in a predetermined duration, and Ref_Num_Visits is a predetermined parameter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
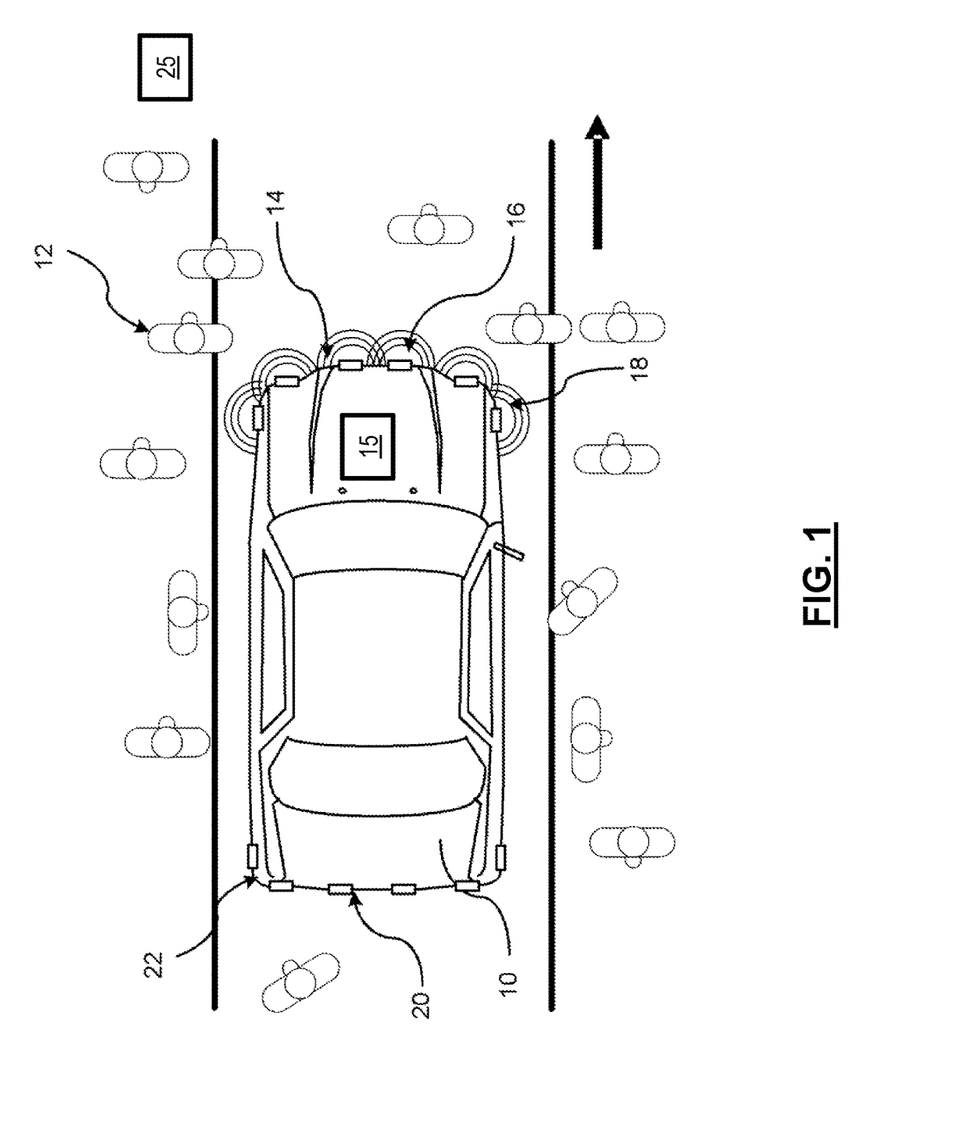
FIG. 1 is a plan view of a vehicle sensing pedestrians according to one or more embodiments.

FIG. 1 is a plan view of a vehicle sensing pedestrians according to one or more embodiments. In the illustrated example scenario, a vehicle 10 is traveling along a roadway 11 in a densely populated area where multiple pedestrians 12 travel on different sides of the vehicle 10. The vehicle 10 may travel within the populated area at slow speeds due to traffic congestion caused by an excessive number of vehicles on the road and number of pedestrians crossing the roads at intersections. The pedestrians 12 includes walking pedestrians, jogging pedestrians, or cycling pedestrians in the roadway and on nearby sidewalks. Roadways may also include pedestrian lanes disposed adjacent to the curb (not shown) in the road and is used for runners and bicyclers.

The vehicle 10 is equipped with a sensing device 14 that includes one or more sensors or like devices that are regionally disposed around the vehicle for sensing pedestrians proximate to the vehicle 10. The sensors may be disposed at the front of the vehicle 16 and the front corners of the vehicle 18 in addition to the rear of the vehicle 20 and the rear corners of the vehicle 22. The vehicle 10 includes a controller 15 that analyzes the information received from the one or more sensors to detect a pedestrian. In addition, the vehicle 10 receives pedestrian information from external devices. For example, a traffic controller 25 is shown that sends pedestrian information to the controller 15. The traffic controller 25 uses infrastructure sensors, along the road etc., external to the vehicle 10, to detect pedestrians 12. Based on the pedestrian information, the controller 15 generates one or more warnings for the operator of the vehicle 10.

In one or more examples, the infrastructure sensors (such as the cameras) are mounted high over an intersection and have a broader view of an intersection and/or roadside along which the vehicle 10 is traveling. Accordingly, human drivers and the vehicle built-in sensors are limited by line-of-sight and environment visibility, for example, the driver's view is blocked by other vehicles, trees, buildings at an intersection. Hence, the technical solutions described herein facilitate the vehicle controller 15 to utilize the infrastructure sensors to detect the presence of pedestrians and share the information with passing vehicles 10. The technical solutions described herein accordingly facilitate extending the range of sensing for the vehicle 10 and also enhance the environment visibility.

Figure 2:
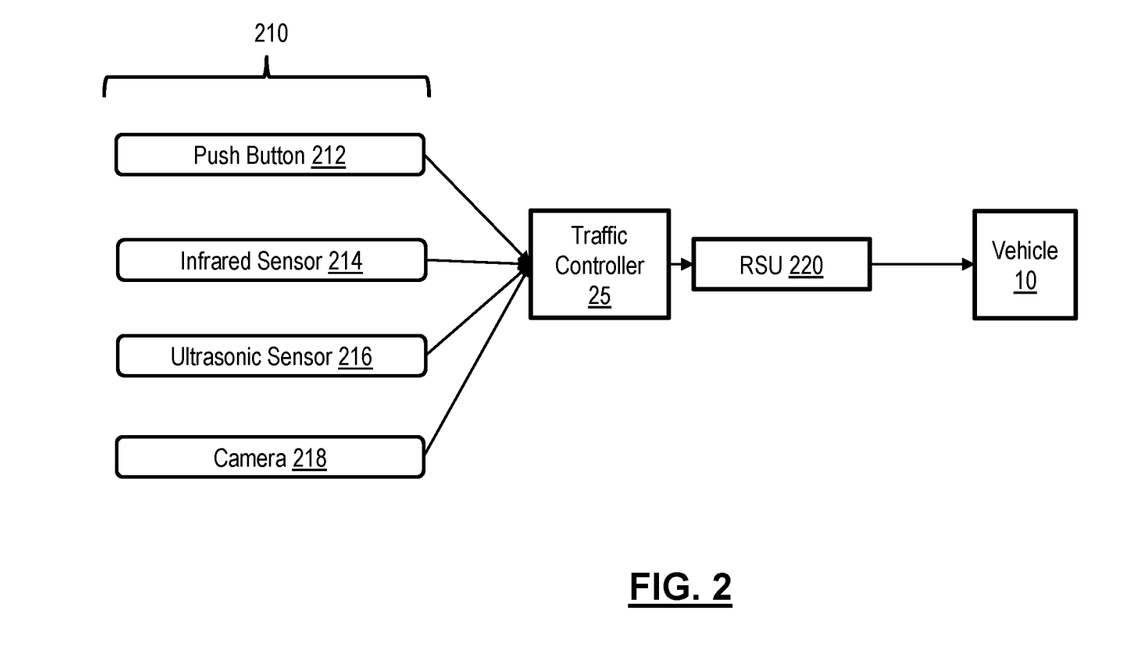
FIG. 2 depicts a block diagram of a traffic controller according to one or more embodiments.

FIG. 2 depicts a block diagram of a traffic controller according to one or more embodiments. As illustrated the traffic controller 25 obtains pedestrian information from one or more infrastructure sensors 210. The infrastructure sensors 210 include various types of sensors such as a push button 212, an infrared sensor 214, an ultrasound sensor 216, a camera 218, and the like. The information received from the infrared sensors 210 is used by the traffic controller 25 to detect the presence of pedestrians 12. The traffic controller 25 uses a roadside unit (RSU) 220 to broadcast the pedestrian info to nearby vehicles, such as the vehicle 10. Here, nearby vehicles include vehicles within a predetermined vicinity or range in which the RSU 220 can broadcast information. For example, the RSU 220 may use wireless communication protocols for broadcasting vehicle information, such as Dedicated Short Range Communications (DSRC) to transmit the pedestrian information to the vehicle controller 15.

The vehicle controller 15 (FIG. 1) evaluates a risk of collision between the vehicle 10 and one or more detected pedestrians 12. Based on the evaluation, the vehicle controller 15 gives a driver a selected level of warning, such as image warning, voice warning, haptic warning, etc. Selecting the level of warning includes suppressing one or more warnings, and determining an appropriate level of warning for the driver according to the evaluation.

Figure 3:
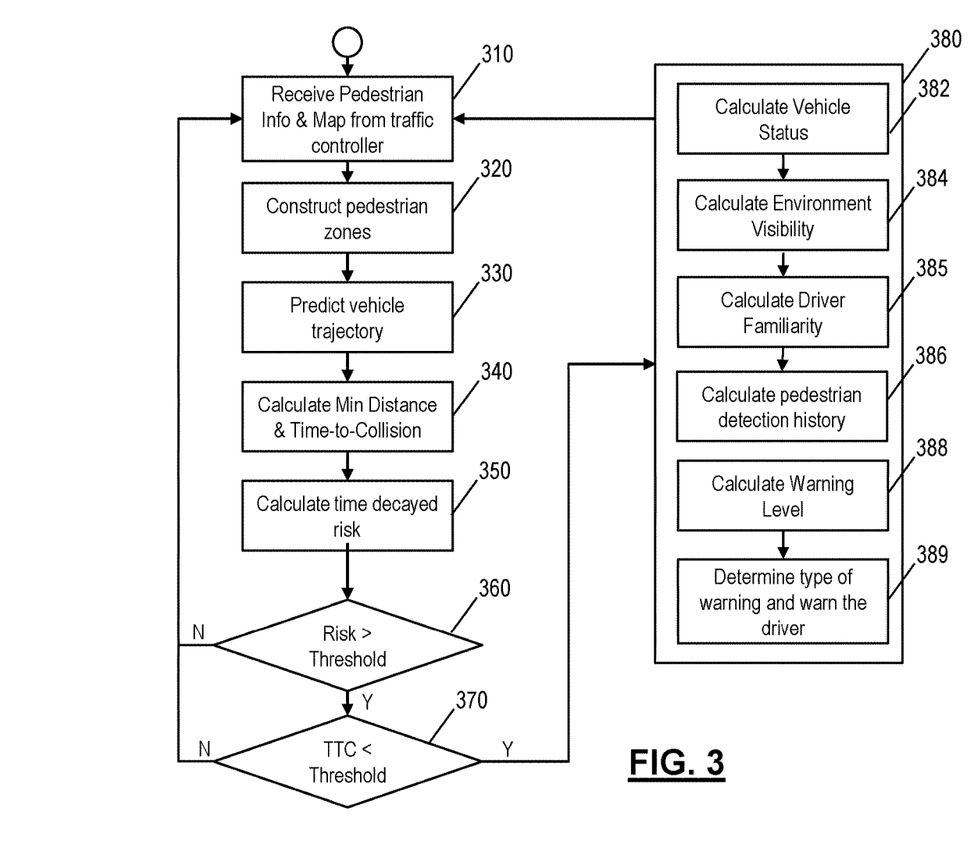
FIG. 3 depicts a flowchart of an example method for evaluating a risk of pedestrian collision and generating a selected warning in response according to one or more embodiments.

FIG. 3 depicts a flowchart of an example method for evaluating a risk of pedestrian collision and generating a selected warning in response according to one or more embodiments. The method may be executed by the vehicle controller 15, in one or more examples. The method includes the vehicle controller 15 receiving the pedestrian information from the traffic controller 25, at 310. The pedestrian information includes pedestrian light SPaT (Signal Phase and Timing) information. For example, the SPaT includes information when a pedestrian 12 activates a pedestrian crossing button. Alternatively, or in addition, the SPaT includes pedestrian crossing signal information from an automated pedestrian crossing system that is activated automatically on a periodic basis or in response to detecting a pedestrian. The pedestrian information received may further include a timestamp that indicates push-button trigger time, or when the pedestrian crossing was activated in case of an automated crossing system. Alternatively, or in addition, the pedestrian information further includes pedestrian location, for example, obtained from the camera 218, the infrared 214, and/or ultrasonic 216 sensors.

In one or more examples, the vehicle controller 15 also receives a map from the road side unit 220, at 310. The map may include a crosswalk or intersection map at which the traffic controller 25 is installed. The map includes dimensions of the crosswalk or intersection.

Figure 4:
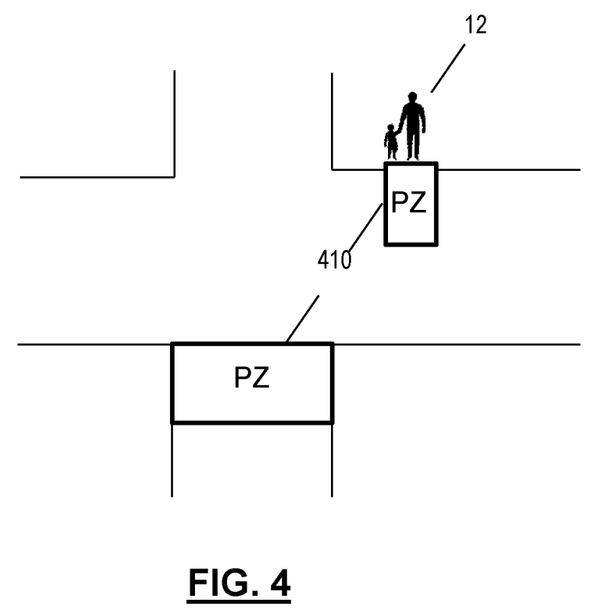
FIG. 4 depicts pedestrian zones according to one or more embodiments.

The method further includes constructing pedestrian zones, at 320. FIG. 4 depicts pedestrian zones according to one or more embodiments. A pedestrian zone 410 represents an area in which one or more pedestrian 12 may appear. Depending on the pedestrian information received, the pedestrian zone 410 the vehicle controller 15 generates different pedestrian zones 410. For example, in case of low-resolution sensors like the push-button 212, the vehicle controller 15 uses the entire crosswalk that covers the entire dimension of the road as the pedestrian zone 410. In case of higher resolution information from the infrastructure sensors 210, the vehicle controller 15 constructs a pedestrian zone 410 that represents a rectangular area a pedestrian 12 is walking toward. The dimensions of the rectangular area is of a predetermined dimension.

The vehicle controller 15 constructs the pedestrian zone 410 using the pedestrian information that includes a location, a moving speed, a direction, an update time, a last observed location, and the like that is obtained from the one or more infrastructure sensors 210 and received from the traffic controller 25.

Referring back to the flowchart in FIG. 3, the method further includes predicting a vehicle trajectory for the vehicle 10, at 330. The vehicle controller 15 obtains vehicle information for generating the vehicle trajectory. The vehicle information includes speed, location (from a Global Navigation Satellite System (GNSS), for example Global Positioning System (GPS)), an orientation, whether the vehicle is in leftmost/rightmost lane, status of the turn signals, a yaw rate, steering wheel angle and the like or a combination thereof. The vehicle controller 15 receives the vehicle information from the one or more subsystems in the vehicle 10 or from one or more systems external to the vehicle 10. For example, a system such as ONSTAR™ may monitor the vehicle 10 and provide such vehicle information to the vehicle controller 15 periodically or when requested.

Figure 5:
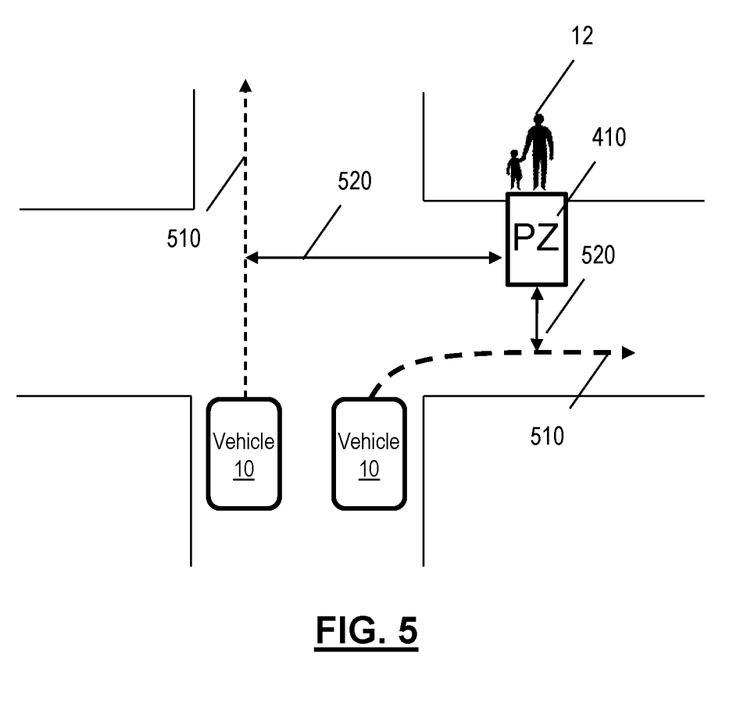
FIG. 5 depicts at least two example scenarios of predicted trajectories.

FIG. 5 depicts at least two example scenarios of predicted trajectories 510 for the vehicle 10. The predicted trajectory 510 can be substantially a straight line or a curve as illustrated. It should be noted that the predicted trajectory 510 can be any different shape in other examples. The vehicle controller 15 may perform the trajectory prediction using any of the one or more techniques that are known or that will be developed.

Referring back to the flowchart of FIG. 3, the method further includes calculating a minimal distance and time-to-collision, at 340. The minimal distance 520 is calculated at a point which is at the minimum distance between the pedestrian zone 410 and the vehicle trajectory 510. Depending on the pedestrian zone 410 and the predicted trajectory 510, the minimal distance 520 varies. Further, once the minimal distance 520 and the point corresponding to the minimal distance 520 is identified, the vehicle controller 15 can compute the time before the vehicle 10 reaches the corresponding minimal distance point to the pedestrian zone 410. The computed time along the predicted trajectory 510 is the time to collision.

The method further includes calculating a time decayed risk, at 350. Calculating the risk includes computing a time decaying confidence function to represent a confidence of pedestrian presence in the pedestrian zone 410. The confidence function calculation increases a confidence-value (CV) if a pedestrian 12 is detected, and decreases the confidence-value (CV) gradually since last detection of pedestrians 12 in the pedestrian zone 410. For example, the confidence function computes $CV=CV+c$, if pedestrians 12 are observed in the pedestrian zone 410 where c is a predetermined constant. Further, the confidence value CV is updated as $CV_{t2}=CV_{t1}+f(t2-t1)$ where $CV_{t2}$ is the confidence-value at t2 if no observation update since time t1, where the function $f$ can be any monotonically decreasing function that is predetermined.

The vehicle controller 15, after updating the confidence-value (CV) computes the risk-value using:

$$Risk = \frac{Ref\_Safe\_Distance}{Minimal\_Distance} \cdot CV$$

Here, Ref_Safe_Distance is a configurable parameter and CV is the time decayed confidence-value, and the Minimal_Distance is the computer minimal distance 520. If the minimal distance 520 is substantially zero, a non-zero lower bound is used instead to avoid a divide-by-zero condition.

The method further includes comparing the risk-value with a predetermined threshold, at 360. If the risk-value is not above the threshold, the vehicle controller 15 loops back to continue monitoring the pedestrian zone 410 and based on updated information. If the risk-value exceeds (or is equal to) the threshold value, the vehicle controller 15 compares the time to collision with another predetermined threshold, at 370. If the time to collision is above the threshold, the vehicle controller 15 loops back to continue monitoring the pedestrian zone 410 and based on updated information. Instead, if the time to collision is less than (or equal to) the threshold, the vehicle controller 15 generates a warning for the operator of the vehicle 10, at 380.

Generating the warning includes determining a warning level for generating the warning. The warning level is determined based on one or more parameters like the vehicle speed (S), the time to collision (C), the vehicle on-board pedestrian detection (B), as well as parameters representing environment complexity, such as visibility (V) and pedestrian detection history (P), and driver familiarity (F), among others or a combination thereof.

The vehicle controller 15 computes a vehicle status based on the one or more parameters, at 382. Computing the vehicle status includes computing the speed-parameter S as follows.

$$S = \frac{Vehicle\_Speed}{Ref\_Safe\_Speed}$$

Here, Ref_Safe_Speed is a configurable parameter that can be predetermined and the vehicle speed is received by the vehicle controller 10 from one or more sensors in the vehicle 10. Further, computing the vehicle status includes computing a time to collision parameter C as:

$$C = \frac{TTC}{Ref\_TTC}$$

where Ref_TTC is a configurable parameter that can be predetermined.

Further, the vehicle status includes computing a vehicle on-board pedestrian detection parameter B, which is a binary value indicating whether the on-board pedestrian detection system of the vehicle 10 has detected a pedestrian 12.

Generating the warning further includes calculating an environment visibility V, at 384. The visibility V can be a function of brightness, wiper movement, temperature, and other environmental parameters received from the one or more sensors of the vehicle 10 and/or from an external sources such as a computer server. An example function to determine V can be a look-up table, table 1.

TABLE 1

| Visibility (V) | Brightness | Wiper |
|---|---|---|
| 0 (good visibility) | day | Not moving |
| 0.5 (medium) | day | Moving |
| 0.6 (medium) | Night | Not moving |
| 1.0 (low visibility) | night | Moving |

TABLE 2

| Warning Level Value | Type of Warning |
|---|---|
| <0.2 | No Warning |
| <0.4 | Text/Image |
| <0.8 | Flashing Text/Image |
| >0.8 | Voice and Haptic |

Here, the visibility V is determined based on the input from a brightness (light) sensor and whether a wiper of the vehicle 10 is moving. It should be noted that the look-up table can be configured differently in other embodiments than the example above. For example, the look-up table may use different, or additional parameters to determine V, such as a temperature. Alternatively, or in addition, in other embodiments, the value of V at corresponding values of brightness and wiper conditions may be different than those in the above example.

Further, generating the warning includes computing a driver familiarity (F) with the road/intersection at which the vehicle 10 is presently, at 385. The vehicle controller 15 computes F as:

$$F = \frac{\text{Ref\_Num\_Visits}}{\text{Ref\_Num\_Visits} - \text{Num\_Visits}}$$

Here, Num_Visits is a number of visits made by the vehicle 10 to the road/intersection, which is monitored and tracked by the vehicle controller 15. Alternatively, or in addition, the vehicle controller 15 receives this number from an external system that monitors the vehicle 10, such as a computer server. In one or more examples, the number of visits may be over a predetermined duration, such as the past week, the past month, or any other predetermined duration. Further, Ref_Num_Visits is a configurable parameter that can be predetermined.

Further, the vehicle controller 15 computes a pedestrian detection history (P) at the intersection, at 386. P is based on a number of pedestrians detected at the intersection in a predetermined past time period, such as past 5 minutes, past 30 minutes, past day, and the like. The vehicle controller 15 computes P as:

$$P = \frac{\text{Pedestrian\_Cnt}}{\text{Ref\_Pedestrian\_Cnt}}$$

Here, Ref_Pedestrian_Cnt is a configurable parameter that can be predetermined, and the Pedestrian_Cnt is the number of pedestrians detected, which may be received from the traffic controller 25.

The method further includes computing a warning level based on the one or more parameters computed, at 388. In one or more examples, the warning level is a function of S, V, F, C, P, and B, or a combination thereof. For example, Warning_Level=$w_1 S+w_2 V+w_3 F+w_4 C+w_5 P+w_6 B$, where $w_i$ are configurable weights, i.e. $\Sigma w_i = 1$. The computed warning level is then used to determine a type of warning to generate, at 389. In one or more examples, the warning level is used to determine the type of warning using a look-up table, such as table 2.

As shown in the above example, based on the warning level being within a particular range, the type of warning varies. The warning types may include visual warning such as a by displaying a text/image on a vehicle display interface (VDI). The warning types may further include flashing the text/image on the VDI to increase an intensity of the warning, so as to attempt to attract the driver's attention. The warning types may further include audible warnings, such as voice, beeps, and the like. The warning types may further include haptic feedback, such as via a steering control, seat(s), and the like. The warning types may include other types of warning in other embodiments, and/or a combination of the types listed above. It should be noted that the above look-up table, table 2, is an example, and that in other embodiments different ranges of warning levels may use different warning types than those depicted herein. Once the warning type is determined, the vehicle controller 15 generates the warning for the driver, at 389. In one or more examples, the vehicle controller 15 may adjust vehicle kinematics, such as reduce speed by applying brakes, generate an audible sound for the pedestrians 12, for example using the horn or other audio devices of the vehicle, generate a visual indication for the pedestrians 12, such as by flashing the lights/indicators of the vehicle, and the like, as part of the warning.

The vehicle controller 15 continues to execute the method in a loop during the operation of the vehicle 10. In one or more examples, the vehicle controller 15 may be instructed to pause and/or resume the execution of the method, for example by the driver via a user-interface like a button, touch screen, and the like.

Accordingly, the technical solutions described herein facilitate providing appropriate levels of warnings to the driver based on pedestrian detection. The technical solutions herein use time decaying function to dynamically evaluate the confidence of pedestrian detection, therefore reducing false positive alarms. The technical solutions herein can, hence, reduce unnecessary warnings generated for the driver. The technical solutions described herein improve the warning system of the vehicle, and the operation of the vehicle in general. The technical solutions herein calculate warning levels based on vehicle status (speed, TTC, vehicle on-board detection), environment complexity (visibility and pedestrian detection history), and driver familiarity. Further yet, the technical solutions described herein can reduce collisions between a vehicle and pedestrians and enhance the safety of the pedestrians and/or the vehicle. The technical solutions described herein, accordingly, evaluate risk of pedestrian collision and determine the level of warning to be provided to the driver.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method to generate a pedestrian detection warning in a vehicle, the method comprising:
   constructing, by a vehicle controller, a pedestrian zone based on pedestrian information that is received from a traffic controller external to the vehicle;
   computing, by the vehicle controller, a vehicle trajectory that predicts a path for the vehicle;
   determining, by the vehicle controller, a minimal distance between the pedestrian zone and the vehicle trajectory;
   predicting, by the vehicle controller, a time to collision by computing a time for the vehicle to reach a location corresponding to the minimal distance along the vehicle trajectory;
   computing a time-decay risk as:

$$\text{Risk} = \frac{\text{Ref\_Safe\_Distance}}{\text{Minimal\_Distance}} \cdot CV,$$

where Ref_Safe_Distance is a predetermined parameter and CV is a time decayed confidence-value indicative of a pedestrian being present in the pedestrian zone, wherein the vehicle controller predicts the time to collision in response to the time-decay risk being greater than a risk threshold; and
   in response to the time to collision being below a threshold, generating, by the vehicle controller, a warning for an operator of the vehicle.

2. The method of claim 1, wherein the pedestrian information comprises a trigger time corresponding to a push button associated with a pedestrian light.

3. The method of claim 2, wherein the pedestrian information further comprises a pedestrian location.

4. The method of claim 1, wherein the vehicle trajectory is computed based on vehicle information that comprises at least one of a vehicle speed, a vehicle location, and a vehicle yaw rate.

5. The method of claim 1, wherein the confidence-value is computed as CV=CV+c, where c is a predetermined value, if a pedestrian is observed in the pedestrian zone; and as $CV_{t2}=CV_{t1}+f(t2-t1)$ wherein $CV_{t2}$ is the confidence-value at time t2 if there is no updated pedestrian information since time t1, and wherein the function $f$ is a monotonically decreasing function.

6. The method of claim 1, wherein generating the warning further comprises:
   selecting a warning level based on a vehicle status, an environmental visibility, and an intersection familiarity.

7. The method of claim 6, wherein determining the vehicle status comprises:
   computing $$S = \frac{\text{Vehicle\_Speed}}{\text{Ref\_Safe\_Speed}},$$

where Ref_Safe_Speed is a predetermined parameter; and
   computing $$C = \frac{TTC}{\text{Ref\_TTC}},$$

where TTC is the time to collision, and Ref_TTC is a predetermined parameter.

8. The method of claim 6, wherein the environmental visibility is determined based on a brightness value in vicinity of the vehicle, and based on whether a wiper of the vehicle is being used.

9. The method of claim 6, wherein the intersection familiarity is computed as $$F = \frac{\text{Ref\_Num\_Visits}}{\text{Ref\_Num\_Visits} - \text{Num\_Visits}},$$

where Num_Visits is a number of times the vehicle has passed the intersection in a predetermined duration, and Ref_Num_Visits is a predetermined parameter.

10. A system for pedestrian warning in a vehicle, the system comprising:
   a traffic controller external to the vehicle; and
   a vehicle controller receiving pedestrian information from the traffic controller external to the vehicle, the vehicle controller configured to generate a pedestrian detection warning based on evaluating the pedestrian information, the generation of the pedestrian detection warning comprising:
      constructing a pedestrian zone based on pedestrian information that is received from the traffic controller external to the vehicle;
      computing a vehicle trajectory that predicts a path for the vehicle;
      determining a minimal distance between the pedestrian zone and the vehicle trajectory;
      predicting a time to collision by computing a time for the vehicle to reach a location corresponding to the minimal distance along the vehicle trajectory; and
   in response to the time to collision being below a threshold, generating a warning for an operator of the vehicle,
   wherein the vehicle controller is further configured to compute a time-decay risk as:

$$\text{Risk} = \frac{\text{Ref\_Safe\_Distance}}{\text{Minimal\_Distance}} \cdot CV,$$

where Ref_Safe_Distance is a predetermined parameter and CV is a time decayed confidence-value indicative of a pedestrian being present in the pedestrian zone, and wherein the vehicle controller predicts the time to collision in response to the time-decay risk being greater than a risk threshold.

11. The system of claim 10, wherein generating the warning further comprises selecting a warning level based on a vehicle status, an environmental visibility, and an intersection familiarity.

12. The system of claim 10, wherein the pedestrian information comprises a trigger time corresponding to a push button associated with a pedestrian light.

13. A computer program product comprising a non-transitory computer readable storage medium having one or more computer executable instructions stored thereon that when executed by a vehicle controller cause the vehicle controller to generate a pedestrian detection warning for a vehicle, the generation of the pedestrian detection warning comprising:
    constructing a pedestrian zone based on pedestrian information that is received from a traffic controller external to the vehicle;
    computing a vehicle trajectory that predicts a path for the vehicle;
    determining a minimal distance between the pedestrian zone and the vehicle trajectory;
    predicting a time to collision by computing a time for the vehicle to reach a location corresponding to the minimal distance along the vehicle trajectory; and
    in response to the time to collision being below a threshold, generating a warning for an operator of the vehicle, wherein the vehicle controller further computes a time-decay risk as:

$$\text{Risk} = \frac{\text{Ref\_Safe\_Distance}}{\text{Minimal\_Distance}} \cdot CV,$$

where Ref_Safe_Distance is a predetermined parameter and CV is a time decayed confidence-value indicative of a pedestrian being present in the pedestrian zone, and wherein the vehicle controller predicts the time to collision in response to the time-decay risk being greater than a risk threshold.

14. The computer program product of claim 13, wherein the pedestrian information comprises a trigger time corresponding to a push button associated with a pedestrian light.

15. The computer program product of claim 13, wherein generating the warning further comprises selecting a warning level based on a vehicle status, wherein determining the vehicle status comprises:
    computing $$S = \frac{\text{Vehicle\_Speed}}{\text{Ref\_Safe\_Speed}},$$

where Ref_Safe_Speed is a predetermined parameter; and
    computing $$C = \frac{TTC}{\text{Ref\_TTC}},$$

where TTC is the time to collision, and Ref_TTC is a predetermined parameter.

16. The computer program product of claim 13, wherein generating the warning further comprises selecting a warning level based on an environmental visibility, the environmental visibility is determined based on a brightness value in vicinity of the vehicle, and based on whether a wiper of the vehicle is being used.

17. The computer program product of claim 13, wherein generating the warning further comprises selecting a warning level based on an intersection familiarity, the intersection familiarity is computed as $$F = \frac{\text{Ref\_Num\_Visits}}{\text{Ref\_Num\_Visits} - \text{Num\_Visits}},$$

where Num_Visits is a number of times the vehicle has passed the intersection in a predetermined duration, and Ref_Num_Visits is a predetermined parameter.

* * * * *